Sept. 25, 1928.
E. C. F. OAKLEY
1,685,409
APPARATUS FOR DELIVERING MEASURED QUANTITIES OF LIQUIDS
Filed Jan. 27, 1928 4 Sheets-Sheet 1
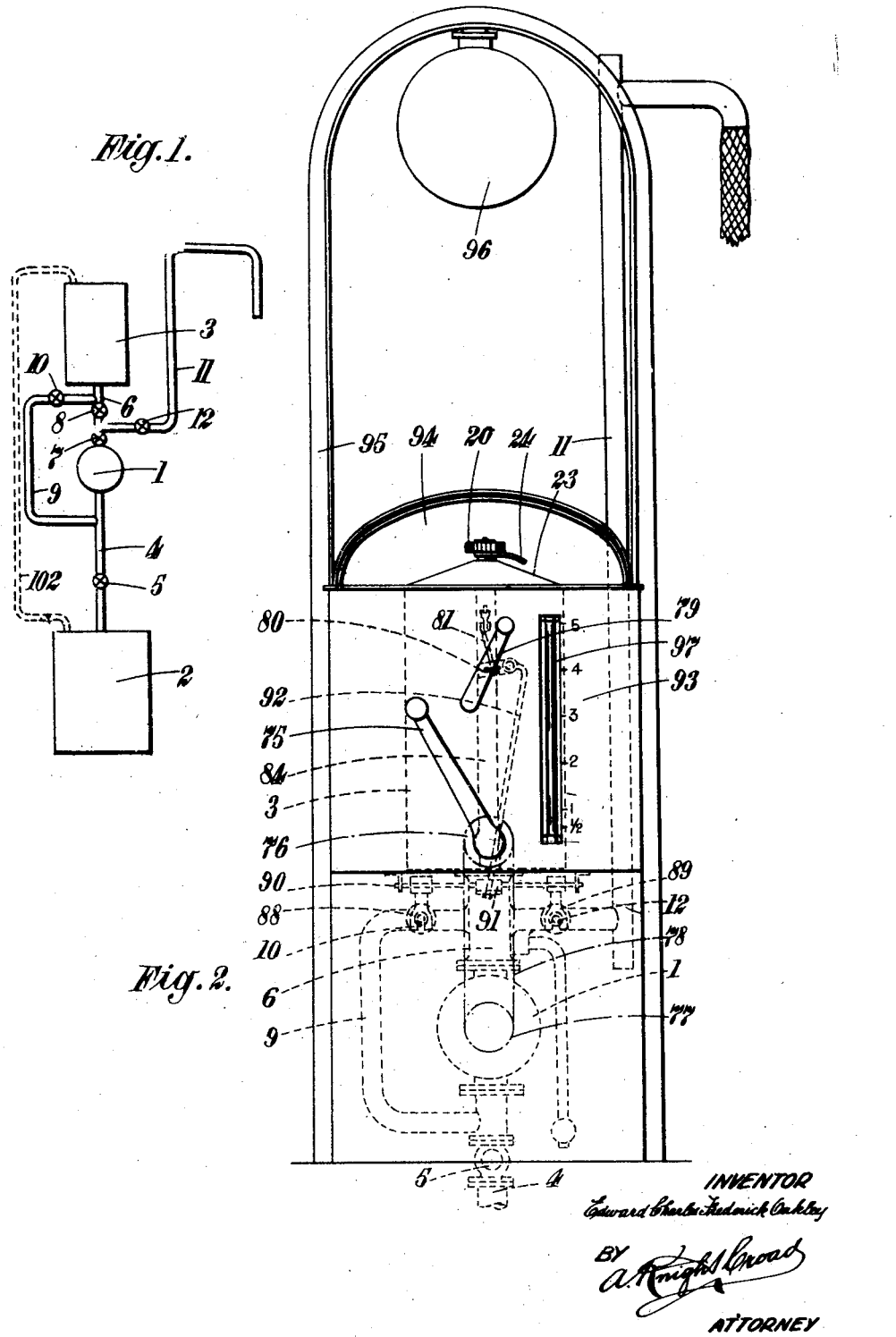

Sept. 25, 1928.  
E. C. F. OAKLEY  
1,685,409  
APPARATUS FOR DELIVERING MEASURED QUANTITIES OF LIQUIDS  
Filed Jan. 27, 1928  
4 Sheets-Sheet 2
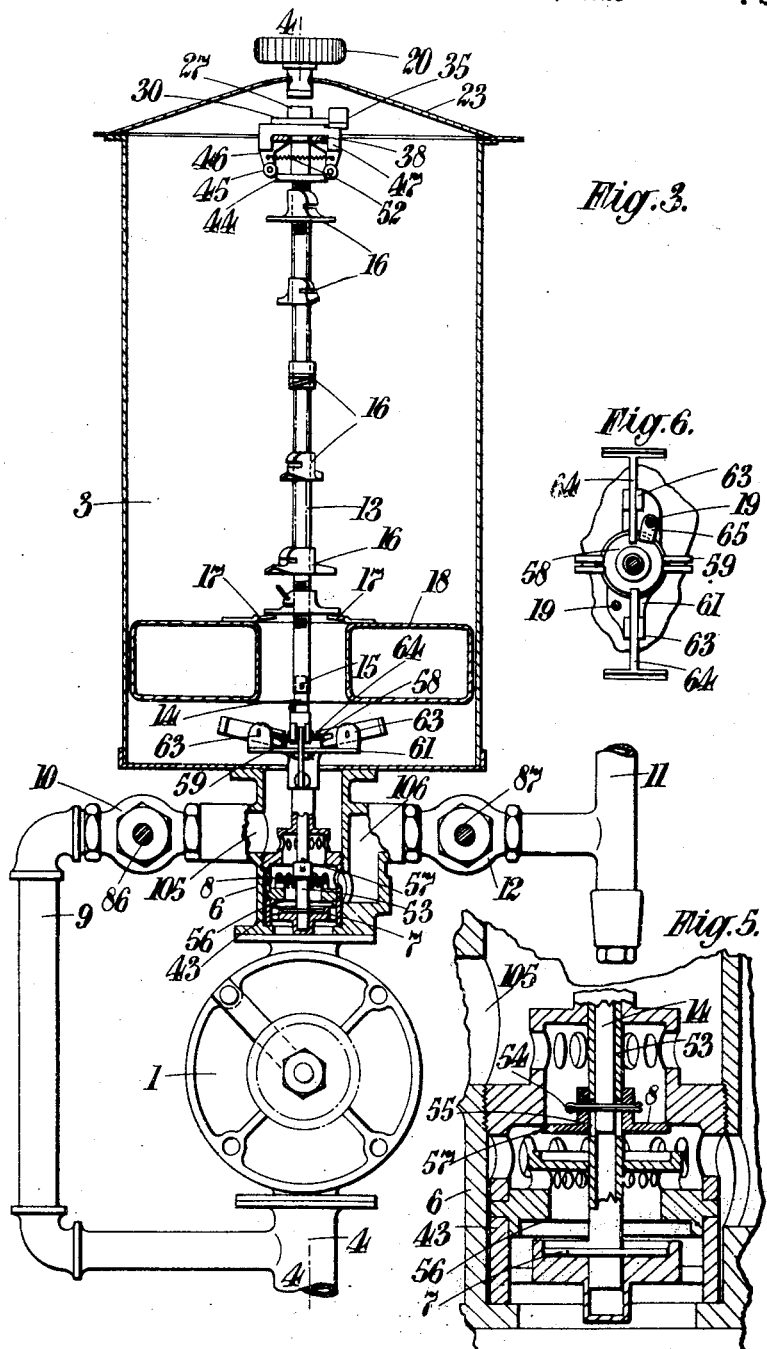

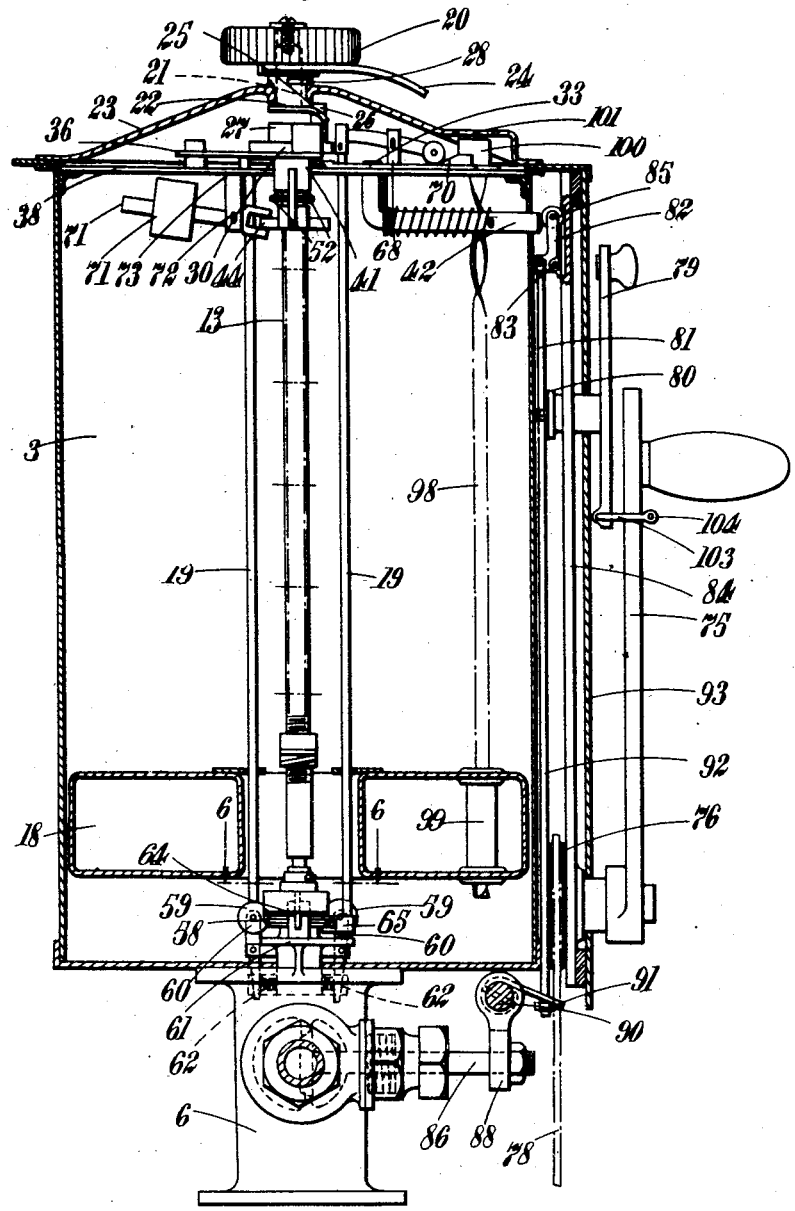

Sept. 25, 1928.  
E. C. F. OAKLEY  
1,685,409  
APPARATUS FOR DELIVERING MEASURED QUANTITIES OF LIQUIDS  
Filed Jan. 27, 1928 4 Sheets-Sheet 4
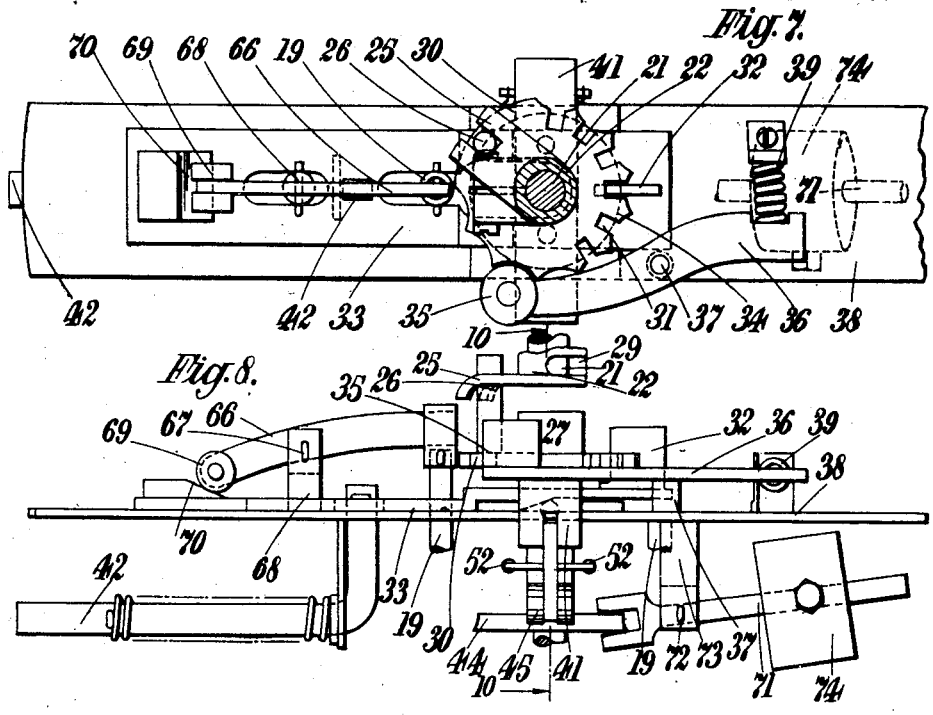
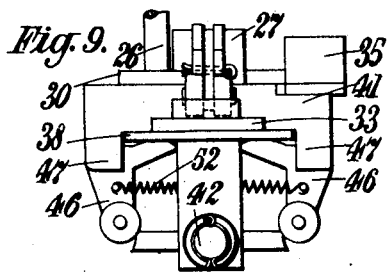
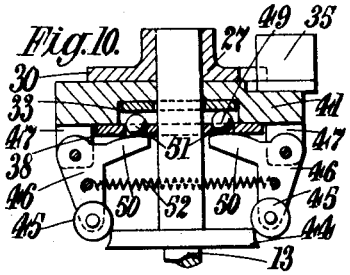
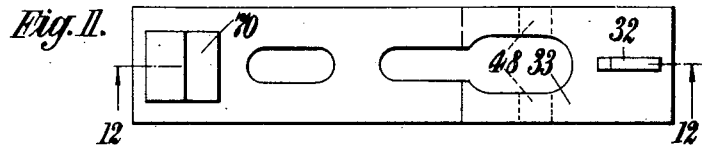

Patented Sept. 25, 1928.

1,685,409

UNITED STATES PATENT OFFICE.

EDWARD CHARLES FREDERICK OAKLEY, OF NORBURY, ENGLAND.

APPARATUS FOR DELIVERING MEASURED QUANTITIES OF LIQUIDS.

Application filed January 27, 1928, Serial No. 250,050, and in Great Britain August 31, 1926.

This invention relates to apparatus for delivering measured quantities of liquids and is particularly adapted for measuring petrol drawn from a tank or container prior to being delivered to the purchaser, and it has for its object a form of apparatus in which the fluid is forced into the measuring vessel and forced out or delivered from same by the same pump.

According to known constructions of measuring and delivery apparatus, the measuring vessel has, (by reason of the fact that the liquid is discharged therefrom by gravity) to be arranged at a considerable height, whereas in the apparatus forming the subject of this invention said measuring vessel may be located below the ground level and the pump, or it may be located immediately above the pump which may be arranged at any convenient accessible height above the ground level and only the delivery pipe need be taken to a higher level for delivery purposes by reason of the fact that the liquid is forced from the measuring chamber.

According to this invention the pump is preferably of the semi-rotary type and the inlet aperture is connected to the suction pipe leading from the storage tank, a suitably arranged non-return valve being located in an accessible position in such pipe. The delivery outlet of the pump is connected to the underside of the measuring vessel, two valves arranged one above the other and controlled by mechanism located within said vessel being arranged in the pipe or part connecting said pump and vessel. The discharge pipe from the measuring vessel is connected to the inlet or suction side of the pump above the non-return valve therein and the delivery pipe is connected to the delivery outlet pipe of the pump below the upper of the two valves. The discharge pipe from the measuring vessel and the delivery pipe are furnished with valves suitably connected together to ensure both valves being either opened or closed together.

In the accompanying drawings which illustrate one embodiment of this invention:—

Figure 1 is a diagrammatic view illustrating the arrangement of essential parts of the apparatus.

Figure 2 is a front elevation of the apparatus.

Figure 3 is a view on an enlarged scale, partly in section, of the pump and measuring vessel.

Figure 4 is a longitudinal section, on a still larger scale, on line 4—4 of Figure 3.

Figure 5 is a sectional view on an enlarged scale of the valves and valve casing.

Figure 6 is a sectional plan on line 6—6 of Figure 4.

Figure 7 is a plan of the mechanism located in the upper part of the measuring vessel.

Figure 8 is a side elevation thereof.

Figure 9 is an end view of Figure 8.

Figure 10 is a section on line 10—10 of Figure 8.

Figure 11 is a plan view of part of the actuating mechanism, and

Figure 12 is a section on line 12—12 of Figure 11.

Referring to Figure 1, 1 is the pump, 2 the storage tank connected to the suction side of the pump, 3 is an intermediate or measuring vessel connected to the outlet side of the pump, 4 is the suction pipe connecting said storage tank and pump, 5 is a non-return valve located in said suction pipe, 6 is a chamber connecting said pump and intermediate vessel, 7 and 8 are valves located in a valve casing secured within the chamber 6, 9 is a discharge pipe connecting the chamber 6 and suction pipe 4, 10 is a valve located in the discharge pipe, 11 is a delivery pipe connected to the chamber 6, and 12 is a valve located in the delivery pipe 11, the parts being so arranged and controlled that the fluid forced into the intermediate vessel is discharged therefrom and delivered by the same pump.

The mechanism within the measuring vessel 3 comprises a centrally disposed rod formed for convenience of assembly and construction in two parts 13 and 14 connected together at 15. The part 13 is hereinafter referred to as the quantity stop rod and is furnished with a plurality of quantity stops 16 arranged at predetermined distances apart, and in order that said stops may be suitably adjusted on the rod 13 the latter is screw threaded throughout its length. The stops 16 are arranged to coact with hinged projections 17 carried by the float 18 normally located near the lower part of the vessel, suitable means such as the vertically disposed rods 19 (Figure 4) being provided for preventing any rotary movement of said float and for lifting said float at a predetermined period in the operation of the pump.

The means for setting the quantity stop rod 13 in a position to deliver a definite quantity of liquid consists of a knob 20 carried by a spindle 21 mounted in a sleeve 22 secured to the top or cover 23 of the measuring vessel 3, said knob being furnished with an indicating finger 24 adapted to coact with a scale on the cover 23. The inner end of the spindle 21 is provided with a forked member 25 adapted to engage with a pin 26 carried by a part 27 secured to the upper end of the quantity stop rod 13. In order to determine the maximum rotary movement in either direction of the knob 20, a limiting pin 28 is provided on the spindle 21 which operates in a slot 29 provided in the sleeve 22.

The part 27 is provided with a disc 30 furnished with a plurality of radially disposed slots 31 (Figure 7) and said slots are adapted to be engaged by a locking member 32 mounted on a horizontally disposed sliding plate 33. The outer edge of the disc 30 is also formed with a plurality of serrations or curved seatings 34 adapted to be engaged by a roller 35 mounted on the end of an arm 36 pivoted at 37 on a plate 38 secured to the measuring vessel 3 said roller being maintained in a position just free from contact with the disc 30 by being pressed by the spring 39 against a stop formed on the part 41, said roller serves to determine accurately the position of the disc 30 relatively to the locking member 32.

The upper end of the quantity stop rod 13 is supported by and slides in the part 41 secured to the plate 38 and this part is slotted and forms a guide way for the plate 33 traversed in the manner hereafter described by the upper end of the operating rod 42.

The lower end 14 of the quantity stop rod 13 is connected to and carries the upper valve 8 located in the valve casing 43 and means are provided at the upper end of the quantity stop rod 13 for maintaining the valve 8 in the closed position and such means may consist of a disc 44 secured to the rod 13 arranged to coact with a pair of rollers 45 carried by a pair of bell-crank levers 46 pivoted in lugs 47 on the part 41.

The sliding plate 33 is provided on its underside with two cam surfaces 48 (Figure 12) arranged to coact with balls 49 adapted to rest on the upper edges of the arms 50 of the bell-crank levers 46 said balls being located in holes 51 provided in the fixed plate 38, the arrangement being such that, when the plate 33 is caused to slide transversely by the operating rod 42 being pushed inwardly, the balls 49 press downwardly on the arms 50 and separate the rollers 45, which are normally maintained in their innermost position by the springs 52, thereby permitting the disc 44 and quantity stop rod 13 to fall and the valve 8 to open.

The main or lower valve 7 is carried by a tubular member 53 (Figure 5) through which the part 14 of the quantity stop rod 13 is adapted to pass, the valve 8 being connected to the part 14 by a pin 54 which works in a slot 55 provided in the member 53. The valve casing 43 is provided with a seating 56 for the valve 7 and a seating 57 for the valve 8.

The upper end of the tubular member 53 is adapted to slide vertically in an extension formed on the valve casing 43 and is provided at its upper end with a disc 58 the position of which is controlled by a pair of rollers 59 carried by a pair of oppositely disposed arms 60 pivoted on a part 61 fixed to the upper end of the extension on the valve casing 43. The lower ends of the arms 60 are pressed outwardly by springs 62. The part 61 is further provided with a pair of oppositely disposed lugs 63 in which are pivoted a pair of oppositely disposed rocking levers 64 the inner ends of which are slotted to enable the disc 58 to be engage thereby. The outer ends of the rocking levers are preferably formed T-shaped so as to provide a bearing surface for the underside of the float 18 when the measuring vessel is empty.

The guide rods 19 are supported at their upper ends by the plate 38 at the top of the measuring vessel 3 and at their lower ends in the part 61. One of the rods 19 is preferably fixed while the other has a limited sliding movement in both the plate 38 and part 61 and is provided with a lug 65 adapted to engage with the disc 58.

The guide rod 19, which carries the lug 65, is further connected at its upper end with a lever 66 pivoted at 67 on a part 68 secured to the fixed plate 38. The other end of the lever 66 is provided with a roller 69 adapted to coact with a cam surface 70 provided on the sliding plate 33 so that when the rod 42 is actuated the rod 19 is depressed and through the lug 65 forces the disc 58 and thereby the valve 7 downwardly and at the same time the outer ends of the rocking arms 64 are raised by reason of their connection with disc 58, thereby lifting the float.

In order to overcome the friction between the disc 44 and rollers 45 and also to balance the weight of the stop rod 13, a lever 71 is pivoted at 72 to a part 73 secured to the underside of the fixed plate 38, one end of said lever is forked and arranged to engage with the disc 44 and a balance weight 74 is adjustably mounted on the other end of the lever 71.

The pump 1 is actuated by the reciprocating lever 75 through sprocket wheels 76 and 77 and chain 78.

The mechanism within the vessel 3 is actuated and set by the lever 79 furnished with an arm 80 to which is slidably connected a rod 81 connected at its upper end to a bell-crank lever 82 pivoted at 83 to a member of the main frame 84. The other arm of the bell-crank lever 82 is provided with a roller 85 adapted to bear against the outer end of the spring controlled operating rod 42.

The stop cocks or valves 10 and 12 in the discharge and delivery pipes 9 and 11 are of the spring controlled poppet type as shown in Figure 4 the outer ends of the valve stems 86 and 87 (Fig. 3) are arranged to be engaged by forked members 88 and 89 mounted on a rocking bar 90 provided with a centrally disposed arm 91 said rocking bar being actuated by a rod 92 the upper end of which is connected to the outer end of the arm 80. The upper end of the rod 92 is so shaped that it will not be brought into contact with the spindle of the lever 79 and thereby prevent the said lever being thrown over to the left to the full extent. The lower end of the rod 92 is free to slide freely through the arm 91 in a downward direction but will rock the bar 90 when pulled upwardly by the lever 79 when the latter is moved to the left thereby drawing the valves 10 and 12 off their seats.

All the mechanism above described, with the exception of the levers 75 and 79 is enclosed in a casing 93 furnished with a hood or cover 94. The general framework of the casing 93 and the members supporting the measuring vessel and pump are carried by the main frame 95 which may be arranged to support a lamp 96.

A gauge glass 97 or other suitable device may be provided for indicating the quantity of liquid in the measuring vessel.

Any suitable mechanism may be provided for recording the quantity of fluid delivered and such mechanism may consist, as shown in Figure 4, of a twisted rod 98 arranged to slide freely through a suitably shaped passage 99 provided in the float 18. The upper end of the rod 98 is furnished with a suitable counting mechanism 100 visible through an aperture 101 provided in the top plate 23 of the measuring vessel 3.

The measuring vessel 3 is furnished with a suitably arranged vent pipe and said pipe may discharge into the atmosphere or be taken back to the storage tank 2 as indicated by dotted lines 102 in Figure 1.

The levers 75 and 79 may if desired be locked together to prevent the unauthorized use of the apparatus in any desired manner, such as by securing a U-shaped link 103 (Figure 4) to an extension on the lever 79 the free ends of such link being arranged to embrace the lever 75 and to be held in position by a pin 104 passed through eyes formed in the ends of the link 103, which pin may be secured by a padlock or other securing means.

The operation of the pump is as follows:—

Assuming the pump to be locked against use, release the levers 75 and 79 and open the cover 94. Press the lever 79 to the right, the result is to pull down rod 81 and causes roller 85 on bell-crank lever 82 to press against the operating rod 42 forcing same inwardly thereby traversing the plate 33 until the locking member 32 is disengaged from the slot 31, turn knob 20 until the quantity stop rod 13 is set to the position to deliver the required quantity. The sliding of the plate 33 has, by the action of the cam surfaces 48 and 70 effected the opening of the valves 7 and 8. While maintaining the lever 79 in the extreme right hand position the pump handle 75 is actuated to draw sufficient liquid into the vessel to lift the float free from the rocking levers 64, when this has been effected the lever 79 may be released, thereupon the sliding plate 33 and the parts actuated thereby return to normal position. Pumping is contined until the desired quantity has been delivered to the vessel 3 determined by the rising of the float 18 and the stops 17 coming into engagement with one of the stops 16 on the quantity stop rod 13 which is moved upwardly and carries with it the disc 44 located at the upper end thereof and the valve 8 located at the lower end thereof, thereby preventing the delivery of any further liquid to the measuring vessel. The next movement is to throw the lever 79 over to the left, but, in order to make certain that the bottom valve 7 is open, it is advisable as a precautionary measure to first move the lever 79 to the right so as to depress the guide rod 19 by means of the cam surface 70 acting on roller 69 and lever 66, the depression of said guide rod acting on the disc 58 through the lug 65 removing the valve from its seat. This having been carried out the lever 79 is thrown over to the left, this action causes the rod 92 to lift the arm 91 and rock the bar 90 thereby opening the main transfer valves 10 and 12.

Pumping is now continued and the liquid in the vessel 3 is drawn therefrom, through the upper part of the chamber 6 into the passage 105 through valve 10 and pipe 9 into the suction pipe 4, through the pump 1 by which it is forced into the valve chamber through the apertures in the valve casing 43 and into the passage 106 through the valve 12 to the delivery pipe 11. As pumping continues and the liquid in the vessel falls the float 18 drops with it until it rests on the rocking levers 64 which thereupon lift the disc 58 and therewith lift the valve 7 against its seat thereby preventing further delivery. The lever 79 is now returned to its normal position on the right thereby permitting the valves 10 and 12 to close under the influence of their springs.

To set the pump for the delivery of the next quantity of liquid the lever 79 should be moved into its extreme right hand position in order to release the stop rod and depress the guide rod so as to open both of the valves 7 and 8.

What I claim is:—

1. An apparatus for delivering measured quantities of liquid comprising in combination a pump, a storage tank connected to the suction side of said pump, a measuring vessel connected to the outlet side of said pump, a suction pipe connecting said storage tank and pump, a non-return valve located in said pipe, a valve chamber connecting said pump and measuring vessel, a valve casing secured within said valve chamber, a pair of valves located and operating within said valve chamber, a discharge pipe connecting said valve chamber and suction pipe, a valve in said discharge pipe, a delivery pipe connected to said valve chamber, a valve in said delivery pipe, mechanism within said measuring vessel comprising a quantity stop rod, a plurality of stops on said rod, means for setting same in position for delivering a definite quantity of liquid, a float coacting with the stops on the quantity stop rod, means for guiding said float, means for closing the valves in the valve casing, means for maintaining said valves in the closed position, and means for opening said valves, mechanism without the measuring vessel comprising means for actuating the means within the vessel for setting the quantity stop rod and the means for opening and closing the valves in the valve casing, means for actuating the valves in the discharge and delivery pipes and means for actuating the pump.

2. An apparatus for delivering measured quantities of liquid comprising in combination a pump, a storage tank connected to the suction side of said pump, a measuring vessel connected to the outlet side of said pump, a suction pipe connecting said storage tank and pump, a non-return valve located in said pipe, a valve chamber connecting said pump and measuring vessel, means located within said measuring vessel for determining the quantity of liquid delivered thereto, a valve casing secured within said valve chamber, a pair of valves located and operating within said valve chamber, means located within said measuring vessel for actuating said valves, a discharge pipe connecting said valve chamber and suction pipe, a valve in said discharge pipe, a delivery pipe connected to said valve chamber, a valve in said delivery pipe, means for simultaneously actuating the valves in the discharge and delivery pipes, mechanism within said measuring vessel comprising a quantity stop rod, a plurality of stops on said rod, means located within the measuring vessel for setting same in position for delivering a definite quantity of liquid, a float coacting with the stops on the quantity stop rod, a pair of guide rods for guiding said float, means operated by said quantity stop rod for closing the valves in the valve casing, means for maintaining said valves in the closed position, and means for opening said valves, mechanism without the measuring vessel comprising means for actuating the means within the vessel for setting the quantity stop rod and the means for opening and closing the valves in the valve casing, means for actuating the valves in the discharge and delivery pipes and means for actuating the pump.

3. In combination, a supply tank, a pump having a connection to the tank for drawing the liquid therefrom, a measuring vessel having a connection with the pump to receive the liquid therefrom, a pair of valves in said last mentioned connection spaced apart and at different heights and closing on their seats when moved towards the measuring vessel, a discharge pipe from the measuring vessel to the suction side of the pump, a delivery pipe extending from the space between the two valves, a float within the vessel, a quantity stop rod movable vertically in said vessel and connected to the uppermost one of the pair of valves, stop means on said rod with means for setting the stop means for contacting the float when it rises to prescribed heights in said vessel, said float thereby serving to lift the rod to close the said uppermost valve against the forcing of any more liquid into said vessel by the pump, a valve in the said discharge pipe, a valve in the said delivery pipe, means for operating said valves for the passage of liquid from the said measuring vessel to the pump and from the pump through said delivery pipe, and means operated by the float when it reaches its lowermost position as a consequence of the liquid having been discharged from said vessel by the pump, for closing the lowermost valve of the pair of valves to prevent further discharge of liquid through said delivery pipe from the pump, substantially as described.

4. Apparatus according to claim 3 in which the uppermost valve is initially opened by downward movement of the quantity stop rod and in which the lowermost valve is opened by a rod extending up through the measuring vessel, and manually operable means for causing downward movement of said rods to open the valves, substantially as described.

5. In combination, a supply tank, a pump having a suction pipe connected with the tank, a non-return valve in said suction pipe, a measuring vessel, a connection between the delivery side of the pump and said vessel, a delivery pipe for delivering liquid from said pump to a point outside of the said vessel, a discharge pipe for conveying liquid from the lower end of the vessel to the suction pipe at a point between the non-return valve and the pump, a valve in the said discharge pipe, a valve in the delivery pipe, manually operable means for controlling the two last mentioned valves, valve mechanism for controlling the flow of liquid from the delivery side of the pump either to the bottom of the vessel or to said delivery pipe, and means within the vessel for controlling said valve mechanism to stop the flow of liquid into the vessel when the prescribed amount has been pumped into said vessel and to stop the further flow of oil from the pump to said delivery pipe when the said pump has delivered the prescribed amount of oil from the said vessel through the said discharge pipe, the suction pipe, the valve mechanism and the delivery pipe, substantially as described.

6. Apparatus according to claim 5, in which the means within the vessel comprises a float which operates the valve mechanism to stop the flow of oil from the pump into the vessel when the float rises to the prescribed height and which stops the flow of oil to the delivery pipe when the float falls to its low position, substantially as described.

EDWARD CHARLES FREDERICK OAKLEY.